United States Patent [19]

Saniscalchi

[11] Patent Number: 4,803,109
[45] Date of Patent: Feb. 7, 1989

[54] METHOD FOR PROTECTION AND WATERPROOFING OF STITCH LINES IN PADDING AND PADDED GARMENTS

[76] Inventor: Lucio Saniscalchi, Via Milano, 53, 22059 Robbiate (Como), Italy

[21] Appl. No.: 65,728

[22] Filed: Jun. 23, 1987

[30] Foreign Application Priority Data

Jun. 27, 1986 [IT] Italy .................. 20953 A/86

[51] Int. Cl.⁴ .................. B32B 3/06; B32B 3/08
[52] U.S. Cl. .................. 428/104; 2/275; 112/420; 112/440; 156/93; 156/338
[58] Field of Search .................. 2/275; 112/418, 420, 112/440; 156/93, 338; 428/102, 104, 355, 356

[56] References Cited

U.S. PATENT DOCUMENTS

| | | | |
|---|---|---|---|
| 4,404,243 | 9/1983 | Terpay | 428/355 X |
| 4,483,019 | 11/1984 | Spangrud et al. | 2/275 X |
| 4,494,246 | 1/1985 | Tillbrook | 2/2.1 R |

*Primary Examiner*—Robert A. Dawson
*Attorney, Agent, or Firm*—Bucknam and Archer

[57] ABSTRACT

A method of waterproofing the stitch lines of padding material having a high degree of thermal insulation, usable in clothing and the like comprises the step of applying a tape composed of a support layer of polyamide fibre fabric, a waterproofing layer of polyurethane resin, and an adhesive layer of great adhesion and cohesion and based on elastomers.

2 Claims, 1 Drawing Sheet

METHOD FOR PROTECTION AND WATERPROOFING OF STITCH LINES IN PADDING AND PADDED GARMENTS

BACKGROUND OF THE INVENTION

Padding materials are currently utilised for the manufacture of many different articles of sports clothing such as windcheaters, anoraks, ski suits and the like. For such purposes the padding must have good characteristics of impermeability to water, whilst exhibiting a certain permeability to air so as to ensure a high degree of protection against the external environment whilst maintaining a high degree of comfort. In the production of such articles of clothing it is necessary to join a number of different pieces together and this is usually achieved by stitching, which inevitably constitutes a possible path for the infiltration of water, especially if the garment is used for a long time in adverse climatic conditions.

All attempts made until now to protect such stitch lines have been found to be entirely insufficient in that they do not completely prevent the infiltration of water through the stitch lines.

OBJECTS OF THE INVENTION

A primary object of the present invention is that of eliminating the above indicated disadvantages by providing a method and means for the protection and waterproofing of stitch lines in padding having a high degree of thermal insulation, usable in clothing and the like, which offers the possibility of preventing the infiltration of water along the stitch lines in an absolute manner without reducing the characteristics of comfort typical of such garments.

Another object of the invention is to provide a method of waterproofing stitch lines in padding in which no complicated application steps are required.

A further object of the present invention is to produce an article of clothing which has considerably improved characteristics, further offering an increased ttrength along the stitch lines.

Still a further object of the present invention is to provide a method which offers the widest guarantees of reliability and safety whilst being performed.

SUMMARY OF THE INVENTION

According to one aspect of the present invention there is provided a process for the protection and waterproofing of the lines of stitching between connected pieces of padding having a high degree of thermal insulation, usable in clothing and the like, characterised by the fact that it comprises the application over the stitch lines of a self-adhesive tape having a support layer coated on one face with a cladding of waterproofing synthetic resin and, on the other face, having an elastomer based self-adhesive layer.

The present invention is applicable to padding for any purposes, including furnishings, but will be described hereinafter with specific reference to clothing without, of course limitation to the generality thereof.

The present invention also comprehends a padded garment having stitch lines rendered waterproof by the method of the invention.

Various other features and advantages of the present invention will become apparent from a study of the following descriptions of a preferred embodiment, in which reference is made to the accompanying drawings, provided purely by way of non-limitative example.

DESCRIPTION OF THE PREFERRED EMBODIMENT

Figure 1:
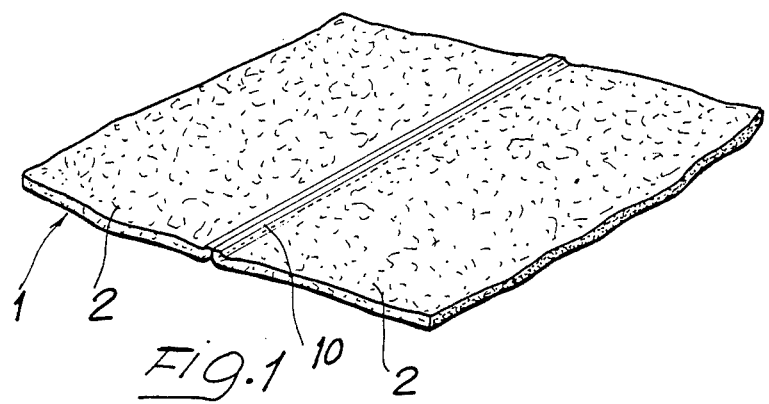
FIG. 1 is a schematic perspective view showing two pieces of padding joined by a line of stitching.
Figure 2:
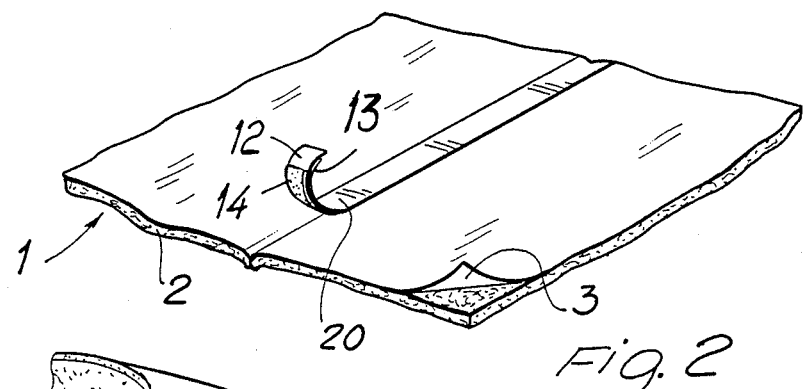
FIG. 2 is a similar perspective view showing the application of the stitch line with an enlarged view of the waterproofing tape itself showing its constituent parts.
Figure 3:
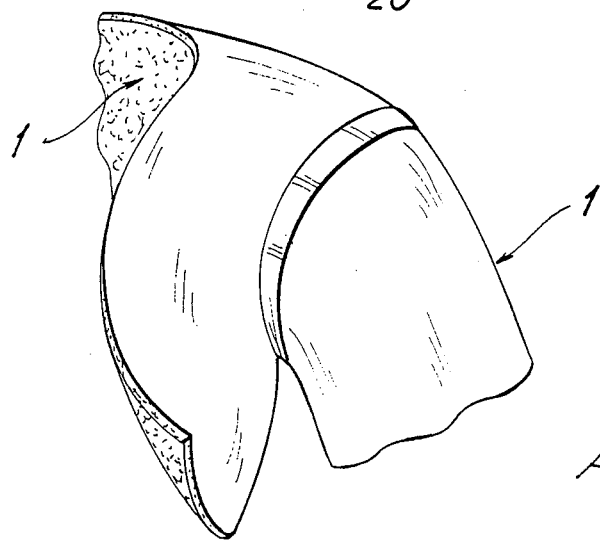
FIG. 3 is a schematic perspective view of a part of an article of clothing provided, along the stitching line, with an adhesive tape applied according to the process of the invention.

With reference now to the drawings, FIG. 1 illustrates padding having a high degree of thermal insulation, for example of the type constituting the subject of earlier Italian Patent applications by the same applicant—(application No. 20978 A/84 of May 17, 1984, now Italian Pat. No. 1,173,792, application No. 23448 A/84 of Nov. 5, 1984, now Italian Pat. No. 1,177,109 and application No. 23693 B/84 of Nov. 5, 1984, now Italian Utility Model No. 201,658) the disclosure of which is included herein by reference.

The padding, which is generally indicated with the reference numeral 1 in the attached drawing, has a layer 2 which is obtained by carding a mixture of fibres of, for example, siliconised polyester or the like, and the production process for the layer provides for the impregnation of the layer 2 with a soft and elastic cross-linkable resin on one side and a more rigid, but elastic, resin on the other side. Subsequently, a calendering operation is performed under controlled temperature and pressure on the impregnated layer to create an air chamber within the padding, and a metallised or other cladding layer 3 is then applied to one face of the layer by appropriate techniques as described in the earlier Patents referred to above. This has the twin benefits of increasing the thermal insulation and increasing the water impermeability of the padding layer 2 whilst maintaining the characteristics of transpirability and comfort. The padding 1 is then ready for making up into various articles of clothing and furnishings.

When the padding 1 is used for making up the garments, however, it is necessary to connect together a plurality of different pieces of padding, preliminarily cut out to shape, and this connection is almost invariably effected by stitching. The lines of stitching so produced have, until now, constituted a possible route for the ingress of air, and particularly moisture, which could penetrate through the cladding fabric and infiltrate into the interior of the garment, particularly if subjected for a long time to rain, sea water spray and so on. Outdoor garments having thermal insulation for the purpose of increasing the werer's comfort thus eventually fail in this purpose when the interior becomes wet. In order to overcome this problem the present invention provides a method involving the application along the stitching lines, schematically indicated 10, of a strip of self-adhesive tape 20 of special type, which is constituted by a polyamide fibre fabric support 12 of high strength which, on one face is treated with a waterproof cladding layer 13 of synthetic resin such as an acrylic, vinyl, polyurethane or other resin which ensures its impermeability to water, whilst ensuring the softness and manipulability of the finished product.

On the other face of the tape 20 there is applied an elastomer based self-adhesive layer 14 which is highly adhesive and also highly cohesive due to characteristics of self cross-linking of the adhesive itself.

In a preferred, but in no way limiting embodiment, a base tape made from a polyamide fibre fabric of between about 50 and 60 grammes/meter is utilised. For general purpose use the most appropriate and preferred colour is white. The waterproof external cladding is made of polyurethane resin applied at a rate of about 5-15 grammes/square meter.

The self cross-linking elastomer based adhesive is applied at a rate of between 30-40 grammes/square meter.

One example of a suitable adhesive is given in the following table, in which the proportions are by weight:

| | |
|---|---|
| natural rubber (NR) | 20.000 |
| antioxidant (sterically inhibited polyphenol) | 0.100 |
| active zinc oxide | 2.000 |
| zinc resinate | 1.500 |
| stearic acid | 0.100 |
| hydrogenated polycyclodiene hydrocarbon resin | 9.000 |
| aliphatic hydrocarbon resin with cyclic structure | 2.000 |
| polyaliphatic hydrocarbon resin | 5.000 |
| reactive alkylphenolic | 3.500 |
| terpene phenolic resin | 2.000 |
| polyvynyl isobutyl ether (60% in benzene) | 2.000 |
| hexane | 50.000 |
| toluene | 50.000 |
| methyl alcohol | 2.000. |

The stitching of individual pieces to form a garment can be performed in the usual way well known to experts in this field. A stitch seam protected with the adhesive tape having the composition indicated above was subjected to tests conducted with Branca waterproof apparatus No. 35, and a well defined impermeability to water was noted. Moreover, the tape once applied is effectively permanent and any attempt to remove the tape causes separation of the cladding from the padding layer, indicating that the bond between the tape and the cladding layer is stronger than the bond between the cladding layer and the underlying padding material itself; moreover, the resistance to washing has been found to be good.

With the seam waterproofing method of the invention there is therefore the possiblity of obtaining an adequate protection of the stitching lines ith the application of the tape in a rapid and easy manner. The provision and design of this tape is of considerable importance in that it allows an item of clothing which has excellent characteristics of comfort to be obtained; in fact, the tape itself blends perfectly with the structure of the item of clothing and follows its shape at all points.

What is claimed is:

1. A method for the protection and waterproofing of lines of stitching between connected pieces of padding having a high degree of thermal insulation, comprising the steps of providing a self-adhesive tape having an adhesive side and an opposite non adhesive side;

cold applying, by contact, over said lines of stitching said adhesive side of said self-adhesive tape, said self adhesive-tape having a support layer, a cladding of waterproofing synthetic resin coated on said non adhesive side of said self-adhesive tape and an elastomer based self-adhesive layer coated on said adhesive side, wherein said support layer is made from a polyamide fibre fabric of between 50 and 60 grammes/meter, said cladding of waterproofing synthetic resin is made of a polyurethane resin applied at a rate of 5-15 grammes/square meter and said elastomer based self-adhesive has the following formulation in parts by weight:

| | |
|---|---|
| natural rubber | 20.000 |
| antioxidant (sterically inhibited polyphenol) | 0.100 |
| active zinc oxide | 2.000 |
| zinc resinate | 1.500 |
| stearic acid | 0.100 |
| hydrogenated polycyclodiene hydrocarbon resin | 9.000 |
| aliphatic hydrocarbon resin with cyclic structure | 2.000 |
| polyaliphatic hydrocarbon resin | 5.000 |
| reactive alkylphenolic resin | 3.500 |
| terpene phenolic resin | 2.000 |
| polyvynyl isobutyl ether (60% in benzene) | 2.000 |
| hexane | 50.000 |
| toluene | 50.000 |
| methyl alcohol | 2.000. |

2. An item of clothing having a layer of padding comprising a plurality of padding pieces stitched together, wherein the stitching lines joining said padding pieces are rendered waterproof by the method according to claim 1.

* * * * *